No. 12,531. REISSUED SEPT. 11, 1906.

J. B. DAUDELIN.

SELF THREADING SHUTTLE.

APPLICATION FILED NOV. 17, 1903.

2 SHEETS—SHEET 1.

WITNESSES
F. N. Houston
Wm. B. Poor.

INVENTOR
Jean Baptiste Daudelin
BY Chas Spear Jr.
ATTORNEY

No. 12,531.

REISSUED SEPT. 11, 1906.

J. B. DAUDELIN.

SELF THREADING SHUTTLE.

APPLICATION FILED NOV. 17, 1903.

2 SHEETS—SHEET 2.

WITNESSES,
F. N. Houston
Wm. B. Poor.

INVENTOR
Jean Baptiste Daudelin
BY Louis Spear
ATTORNEY

UNITED STATES PATENT OFFICE.

JEAN BAPTISTE DAUDELIN, OF FALL RIVER, MASSACHUSETTS.

SELF-THREADING SHUTTLE.

No. 12,531. Specification of Reissued Letters Patent. Reissued Sept. 11, 1906.

Original No. 729,141, dated May 26, 1903. Application for reissue filed November 17, 1903. Serial No. 181,557.

*To all whom it may concern:*

Be it known that I, JEAN BAPTISTE DAUDELIN, a citizen of the United States, residing at Fall River, in the county of Bristol and State of Massachusetts, have invented certain new and useful Improvements in Self-Threading Shuttles; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one form in which I have contemplated embodying my invention and a slight modification of the same, and said invention is fully disclosed in the following description and claims.

Figure 1:
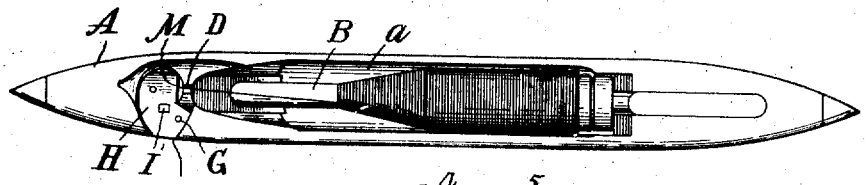
Figure 2:
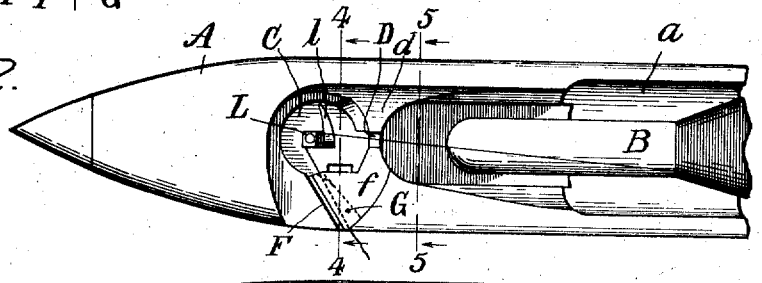
Figure 3:
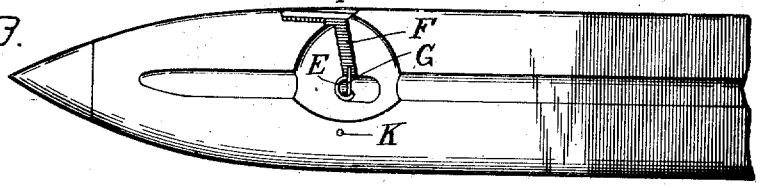
Figure 4:
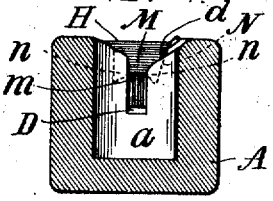
Figure 4A:
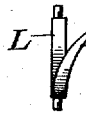
Figure 5:
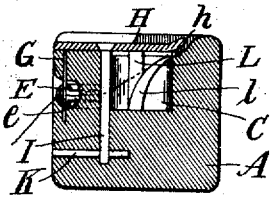
Figure 5:
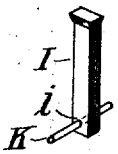
Figure 6:
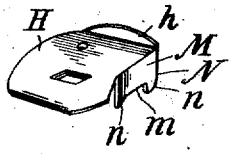
Figure 8:
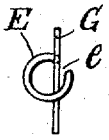
Figure 7:
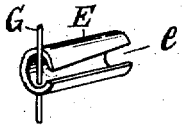
Figure 9:
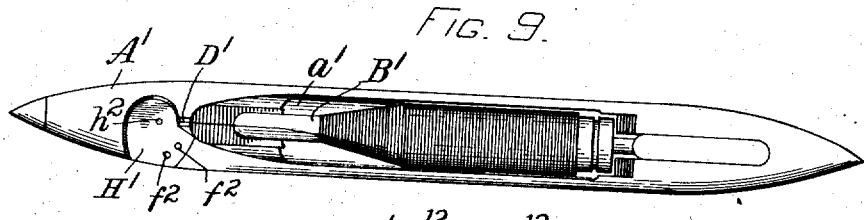
Figure 10:
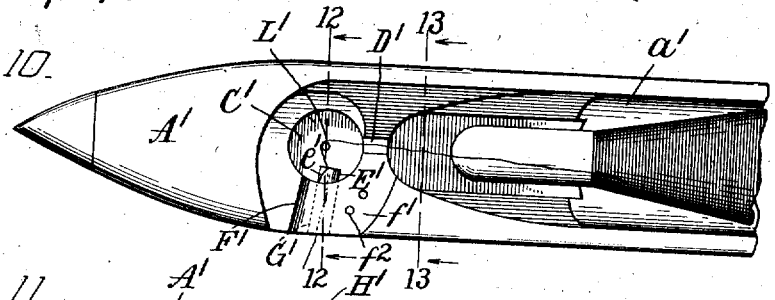
Figure 11:
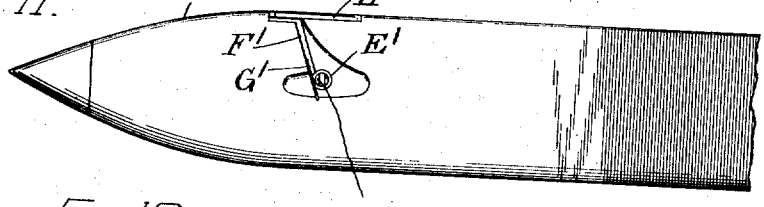
Figure 12:
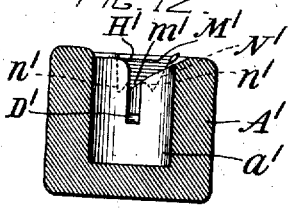
Figure 13:
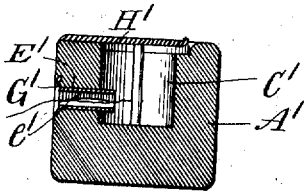
Figure 14:
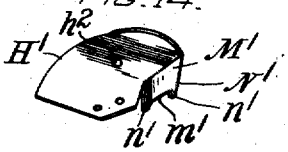
Figure 16:
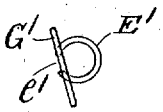
Figure 15:
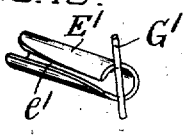

Referring to the said drawings, Figure 1 represents a top plan view of a shuttle embodying my invention. Fig. 2 is an enlarged view of the threading end of the shuttle, showing the threading-plate removed. Fig. 3 is a side elevation of the threading end of the shuttle, showing the threading-plate in place. Fig. 4 is a section on the line 5 5, Fig. 2. Fig. 4ª is a detail of the adjustable tension device. Fig. 5 is a section on line 4 4, Fig. 2. Fig. 6 is a detail perspective view of the threading-plate and its securing-post detached. Fig. 7 is a detail perspective view of the delivery-eye and threading-retaining device. Fig. 8 is an end view of the same. Figs. 9, 10, and 11 are views similar to Figs. 1, 2, and 3, showing a shuttle provided with a slightly-modified form of my invention. Fig. 12 is a sectional view on line 13 13 of Fig. 10. Fig. 13 is a sectional view on line 12 12, Fig. 10. Fig. 14 is a perspective view of the threading-plate. Figs. 15 and 16 are a perspective view and an end view, respectively, of the delivery-eye.

In the form of my invention shown in Figs. 1 to 8, inclusive, A represents the shuttle-body provided with the usual spindle-recess *a*, in which is located the spindle B. C represents the threading-recess, located in the shuttle-body forward of the spindle-recess and being preferably substantially circular in horizontal section. D represents a guiding-notch connecting the spindle-recess *a* with the threading-recess C and having an inclined shoulder *d* on the side opposite the delivery-eye to deflect the thread downward into said notch. E represents a metallic bushing or lining inserted in the delivery-eye on the shuttle. This bushing consists, preferably, of a piece of sheet metal bent into nearly cylindrical form, leaving a slit *e*, through which the thread may enter. F represents the vertically-disposed threading-slit extending from the upper face of the shuttle-body to and communicating with the slit *e* in the delivery-eye. At its outer end the bushing is provided with a thread-retaining device consisting of a vertically-disposed rod G, inserted in the shuttle-body in rear of the threading-slit F and extending across the end of the delivery-eye on the side adjacent to its slit *e*, so as to prevent the thread from accidentally working out through slit *e*. The rod G may pass through a hole in the bottom of the bushing, as shown in Figs. 7 and 8, or may pass outside of the end of the same, as shown in Figs. 15 and 16, the lower end extending into the shuttle-body. In either case a space is left between the upper edge of the bushing and the bar to permit the thread to pass from the opening in the bushing to the other side of the bar, so that the rod G may serve the double purpose of a thread-retaining device and a means for securing the bushing from working out of the shuttle-body. H represents the threading-plate which covers the threading-recess and is supported on a horizontal shoulder *f*, formed on the shuttle body in rear of the threading-slit F. The plate H is provided on the side opposite the delivery-eye with an upturned lip *h*, lying above the inclined face *d* to catch the thread and deflect it down into the recess C. The shuttle-body is cut away around the edges and beneath the plate H from the lip *h* around to the threading-slit F, as shown, so as to permit the thread to pass under the plate and enter the threading-slit. The plate H is held in position by the securing-post I, which has a head (preferably squared) passing through and countersunk into plate H, the lower end of the post I extending downwardly into the body of the shuttle below the threading-recess and provided with an aperture *i*, through which passes a horizontal retaining-pin K, extending transversely through the shuttle-body. Within the threading-recess C is an adjustable tension device, which is pivotally mounted in the bottom of the recess and said plate H and serves also to support the plate adjacent to its center. This tension device consists of a vertical post L, having cylindrical portions at its upper and lower ends to engage apertures in the plate H and the bottom of the threading-recess, respectively, the intermediate portions of said post being preferably square, but having its corners smoothed or rounded to prevent breaking or cutting the thread. From the bottom portion of said post L a curved arm *l* extends upwardly and outwardly, the outer end of said arm being adapted to touch the curved wall of the threading-recess. The post L will be arranged concentric with the curved wall of the recess C, so that said post and arm can be swung around to different positions without removing the arm *l* from contact with the wall of the recess. By this means the thread may be caused to travel between the arm *l* and post L and around post L at different angles, according to the adjustment of the post L, and the latter will be held in its adjusted position by the friction of its cylindrical parts with the plate H and the bottom of the recess C, said plate being held down firmly onto a shouldered portion of the post L, as shown, by the securing-post I. The curvature of arm *l* will also serve to direct the thread when it enters beneath the plate H into the recess between said arm *l* and the post L, as will be clearly seen in Fig. 5. The plate H is also provided with depending flange M adjacent to the threading-notch D, having an inclined edge N adjacent to but not parallel with the inclined shoulder *d*, said flange having at its bottom a recess *m*, formed between two projections *n n*. The operation of this form of my invention is as follows: The operator takes hold of the thread as it leaves the end of the spindle and with a quick forward movement, followed by a quick movement transversely of the shuttle, threads it. During the forward movement the thread is caught under the lip *h* of the plate H and is then carried down between the inclined shoulder *d* and the inclined face N of the flange M and between the arm *l* and post L of the tension device. During the transverse movement the thread is drawn around under the plate H to the threading-slit F, down said slit and into the delivery-eye, thus completing the threading movement, the operation being almost instantaneous. The tension device will be adjusted to give the required tension at the time of assembling the parts of the device. It is to be noted that there are no screws in the construction, which are objectionable, as they are apt to split the shuttle-body.

The form of my invention illustrated in Figs. 9 to 16, inclusive, is substantially identical with that previously described, except that the adjustable tension device is omitted, this form being cheaper in construction than that just described. In these figures, A′ represents the shuttle-body, *a′* the spindle-recess, B′ the spindle, C′ the threading-recess, D′ the threading-notch provided with inclined shoulder *d′*. E′ the delivery-eye provided with slit *e′* and retaining-rod G′, and F′ the threading-slit, all constructed and operating substantially as hereinbefore described. In the threading-recess is placed a vertical post L′, which serves as a tension device and is inserted in the bottom of the threading-recess C′. The threading-plate is secured in position upon the supporting-shoulder *f′* by pins $f^2$ $f^2$ and is provided with an aperture $h^2$ to receive the upper end of the post L′. The plate H is also provided with a lip *h′*, depending flange M′, having the inclined guiding edge N′, and the guiding-recess *m′* between the depending points *n′ n′*, as in the form previously described. The operation of the device in threading the shuttle is identical with that of the form previously described, except that there is no adjustable tension device, the thread merely passing around the post L′, which exerts a certain frictional tension upon the thread.

What I claim, and desire to secure by Letters Patent, is—

1. The combination with the shuttle-body provided with a spindle-recess, a threading-recess forward of the spindle-recess, a threading-notch connecting said recesses having an inclined shoulder, and a delivery-eye communicating with the threading-recess, of a threading-plate covering said threading-recess and having a flange extending downward into the same adjacent to and slightly forward of the threading-notch, said flange being provided with an inclined guiding edge at one side overlapping the edge of the threading-notch provided with the inclined shoulder, said flange being also provided with a guiding-notch in its lower edge in line with the threading-notch, substantially as described.

2. The combination with a shuttle-body provided with a spindle-recess, a threading recess forward of the spindle-recess, a threading-notch connecting said recesses, a delivery-eye connecting with said threading-recess, a bushing for said eye provided with a longitudinal opening, a threading-slit leading to the opening in the said bushing and a bar disposed across the delivery-eye for retaining said bushing and preventing the escape of the thread from the delivery-eye, substantially as described.

3. The combination with a shuttle having a threading-eye of a bushing located in said threading-eye, threading-passages permitting the thread to be drawn into the threading-eye and bushing, and a retaining-bar securing the bushing in place and preventing the escape of the thread from the eye and bushing, substantially as described.

4. The combination with the shuttle-body provided with a spindle-recess, a threading-recess forward of the spindle-recess, and connected therewith by a threading-notch provided with an inclined shoulder, and having a delivery-eye communicating with the threading-recess, of a threading-plate covering said threading-recess, and having a portion resting upon a part of the shuttle-body and provided with a flange extending downward into the threading-recess adjacent to and nearer the side of the shuttle than the side of the threading-notch provided with the inclined shoulder and a securing-post mounted in said threading-recess, and extending through said threading-plate, substantially as described.

5. The combination with a shuttle-body provided with a spindle-recess, a threading-recess forward of the spindle-recess, a threading-notch connecting said recesses, an inclined shoulder adjacent to said notch, and a delivery-eye extending from said threading-recess to the side of the shuttle, of a tension-post disposed vertically in said threading-recess and a threading-plate covering said recess, and engaging said post, said plate having a downwardly-extending flange adjacent to said threading-notch provided with an inclined guiding edge overlapping the side of the threading-notch provided with the inclined shoulder, said flange also having a guiding-recess in its lower edge, in line with the threading-notch, substantially as described.

6. The combination with a shuttle-body provided with a spindle-recess, a threading-recess forward of the spindle-recess, a threading-notch connecting said recesses, an inclined shoulder adjacent to said notch and a delivery-eye extending from said threading-recess to the side of the shuttle, of a threading-plate covering said threading-recess and provided with a flange, having an inclined guiding edge, and a guiding-recess in line with the threading-notch, and an adjustable tension device pivotally mounted in said plate and the bottom of the threading-recess, substantially as described.

7. The combination with a shuttle-body provided with a spindle-recess, a threading-recess forward of the spindle-recess, a threading-notch connecting said recesses, an inclined shoulder adjacent to said notch, and a delivery-eye extending from said threading-recess to the side of the shuttle, of a threading-plate covering said threading-recess and provided with a flange, having an inclined guiding edge and a guiding-recess in line with the threading-notch and an adjustable tension device comprising a post pivotally mounted in said plate and the bottom of the threading-recess and having an upwardly-extending inclined arm, adapted to engage a concentric portion of the wall of said recess, substantially as described.

8. The combination with a shuttle having a delivery-eye, of a bushing located in said delivery-eye, threading-passages permitting the thread to be drawn into the delivery-eye and bushing, and a bar disposed across the delivery-eye for preventing the escape of the thread from the eye and bushing.

9. The combination with a shuttle having a delivery-eye, threading-passages permitting the thread to be drawn into the delivery-eye, and a bar disposed across said delivery-eye to prevent the escape of the thread from the eye.

In testimony whereof I affix my signature in the presence of two witnesses.

JEAN BAPTISTE DAUDELIN.

Witnesses:

SAMUEL J. KELLY,
ADOLPHE BLAIS.